C. PEARSON.
TANDEM DRAFT CONNECTION FOR IMPLEMENTS.
APPLICATION FILED SEPT. 1, 1911.
1,012,220.
Patented Dec. 19, 1911.
2 SHEETS—SHEET 1.
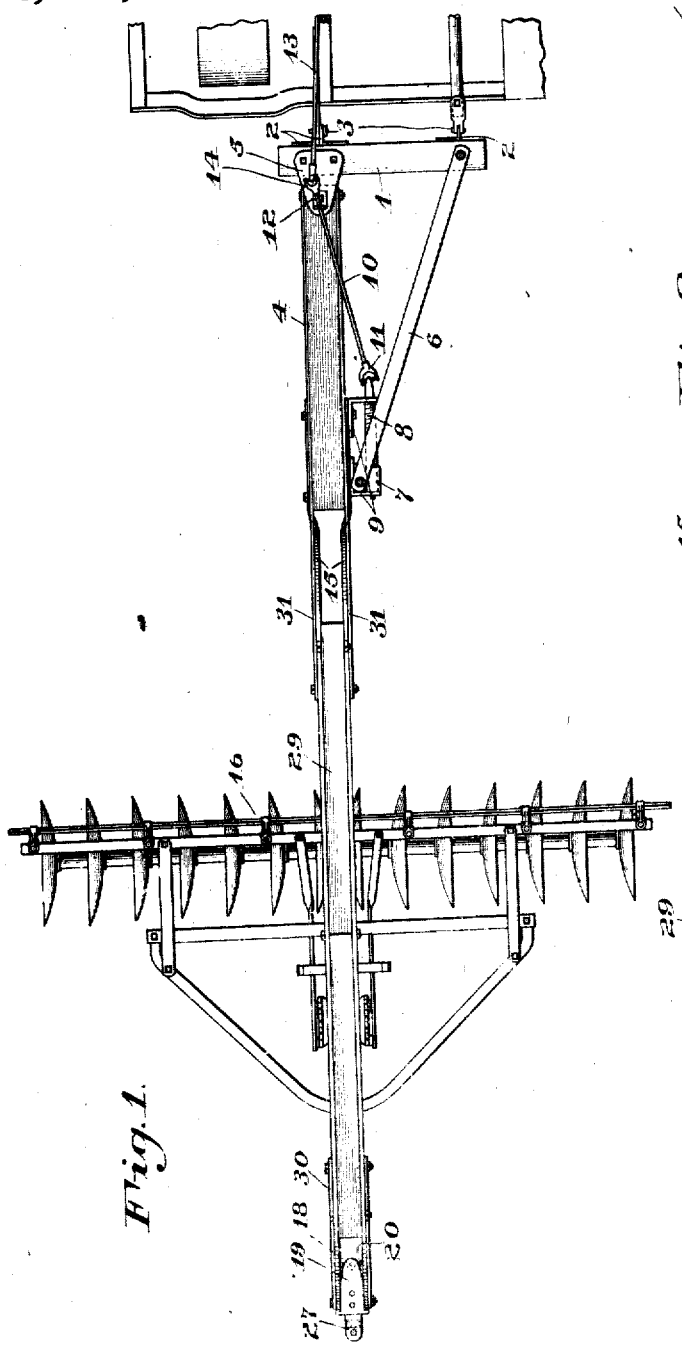
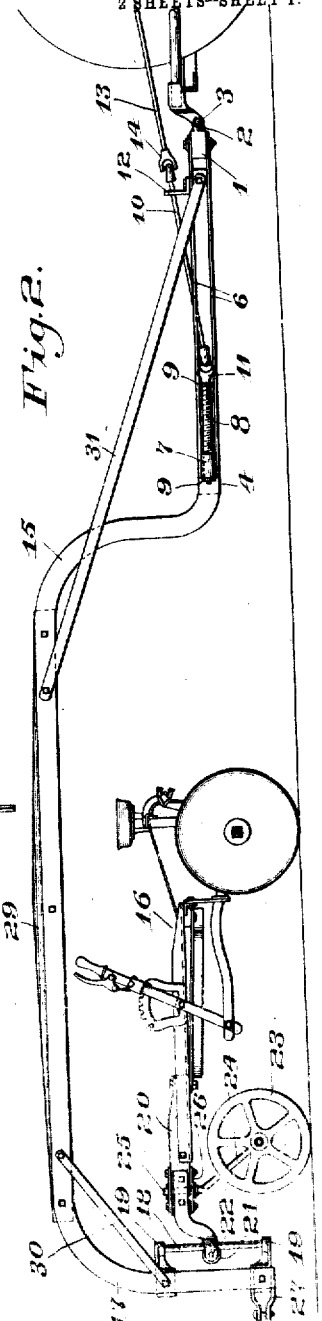
Witnesses:
C. C. Palmer
F. W. Hoffmeister
Inventor,
Charles Pearson.
By E. W. Burgess
Attorney.

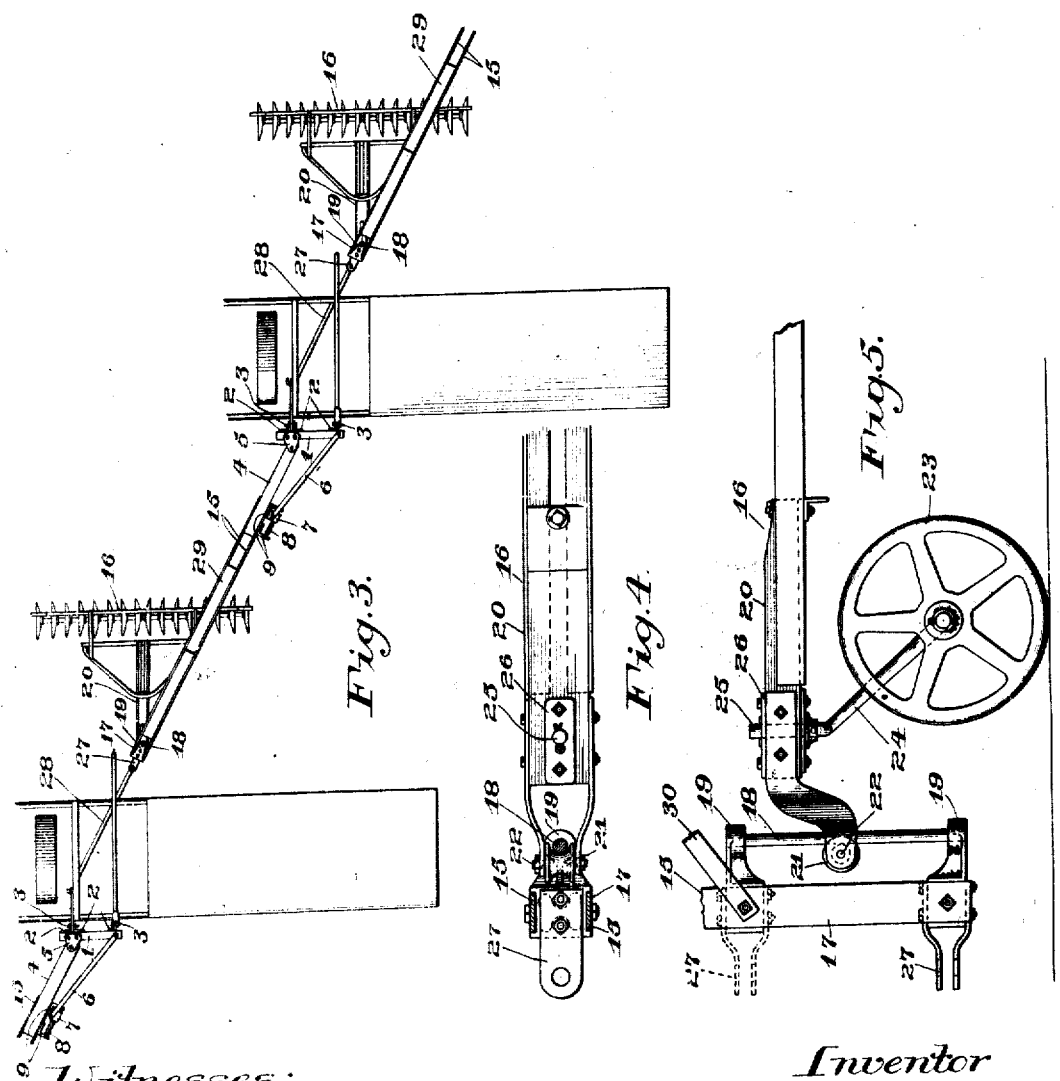

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

TANDEM DRAFT CONNECTION FOR IMPLEMENTS.

1,012,220.   Specification of Letters Patent.   Patented Dec. 19, 1911.

Application filed September 1, 1911. Serial No. 647,200.

*To all whom it may concern:*

Be it known that I, CHARLES PEARSON, a citizen of the United States, residing at Chicago, in the county of Cook and State of Illinois, have invented certain new and useful Improvements in Tandem Draft Connections for Implements, of which the following is a specification.

My invention relates to draft connections for implements, such as harvesters, mowers and tillage implements when used in tandem relation and drawn by means of a traction engine or otherwise, and consists in an improved construction of draft tongue having means whereby two separate implements are connected therewith in a manner permitting the path of advance of the implements to be regulated in relation to each other; the object of my invention being to provide a draft connection whereby a series of implements of diversified character may be operated in tandem relation and their path of advance be controlled at the will of the operator. I attain these objects by means of the mechanism illustrated by the accompanying drawings, in which—

Figure 1 represents a top plan view of part of a harvester and a disk harrow having my improved draft connection forming a part thereof; Fig. 2 represents a side elevation of Fig. 1; Fig. 3 is a plan view representing a series of implements connected together in tandem relation; Fig. 4 is a detached detail of part of the draft tongue; and Fig. 5 represents a side elevation of the part shown in Fig. 4.

The same reference characters designate like parts throughout the several views.

1 represents a cross bar forming part of the draft connection, and 2 clips secured to the rear edge of the bar and having transverse openings therein whereby said bar may be pivotally connected with the frame of a harvester or other implement by means of pins 3.

4 represents a draft tongue member having its rear end received between plates 5 that are secured to the upper and lower sides of cross bar 1 at one end thereof, the tongue being pivotally connected with the forward ends of the plates in a manner permitting it to swing laterally relative to the line of draft of the machine.

6 represents tongue brace members having their rear ends pivotally connected with the opposite end of the cross bar, and at their forward ends is a block 7 that is provided with a threaded sleeve that receives a threaded shaft 8 that is journaled in bearing brackets 9 that are secured to the tongue member 4, the shaft being arranged parallel with said tongue, and means are provided for rotating the shaft in a manner to cause the block to move thereon, the means including a shaft 10 having its forward end connected with the rear end of the threaded shaft by means of a universal coupling 11 and its rear end journaled in a bracket 12 secured to tongue member 4 and connected with an operating shaft 13 by means of a universal coupling 14. The shaft 13 may be extended within convenient reach of the operator whereby the angle of the draft tongue relative to the line of draft of the machine may be regulated at the will of the operator.

The draft tongue 4 is preferably made of wood, and secured to its front end, upon opposite sides thereof, are draft bars 15 that are curved upward and forward and then downward, forming an arched extension of the draft tongue that is adapted to swing about a cultivating implement, such as a disk harrow 16 that is attached to the front leg 17 of the arched extension by means of a vertically arranged draft rod 18 that is connected with the leg by means of bracket members 19, the harrow being provided with a short draft tongue member 20 that curves downward at its front end and having a sheave 21 journaled upon a cross pin 22 that engages with the draft rod 18, whereby the draft tongue connected with the harvester is free to rise or fall at its front end without affecting the operation of the harrow.

23 represents a caster wheel journaled upon an arm 24 that is provided with a vertical stem 25 that is journaled in a bearing block 26 secured to the tongue member 20, and 27 represents draft members that may be secured to either of the bracket members 19 whereby a connection may be made between the front end of the arched extension of the draft mechanism and a reach bar 28 when it is desired to connect a series of implements in tandem relation, as illustrated in Fig. 3, or directly with a draft link of a traction engine. The bars 15 of the arched extension are spaced apart and a reinforcement consisting of a bar of wood 29 secured between them, and 30 represents brace members connecting the horizontal portion of the arch with the leg 17, and 31 other brace members at the rear end of the arched member connecting it with the rear end of the tongue member 4.

In operation the two implements are drawn forward by means of their connection with a single draft tongue, and the line of draft of the rear implement may be controlled by means of the threaded shaft and its connection with the tongue brace member in a manner whereby it may be caused to trail directly in the rear of the harrow, as shown in Fig. 1, or in a path at one side thereof, as shown in Fig. 3, and a multiple series of harvesting and cultivating implements may be operated in the same manner by means of a duplication of draft attachments.

What I claim as my invention, and desire to secure by Letters Patent, is:

1. A tandem draft connection for implements including, in combination, a draft tongue having means at its rear end whereby it may be operatively connected with an implement, said means including mechanism whereby the angle of said tongue may be regulated relative to said implement may be regulated relative to the line of draft, the body portion of said tongue being in the form of an arch and having a depending leg at its front end, draft means connected with said leg and adapted to connect said tongue with a source of tractive power, said means including mechanism whereby a second implement may be flexibly connected therewith in a manner permitting said second implement to swing laterally beneath the arched portion of said draft tongue and permitting the front end of said draft tongue to rise and fall independent of said second implement.

2. A tandem draft connection for implements including, in combination, a draft tongue having means whereby its rear end may be connected with an implement in a manner permitting the angle of said tongue to be regulated laterally relative to the line of draft, the body of said tongue being in the form of an arch and having a depending leg at its front end, draft means connected with said leg and adapted to connect said tongue with a source of tractive power, said means including a vertically arranged bar secured to said leg in rear thereof, a second implement having the forward end of the draft frame thereof slidably and pivotally connected with said bar in a manner permitting said second implement to swing laterally beneath said arched portion of said draft tongue and to permit said draft tongue to rise and fall at its front end independent of said second implement.

CHARLES PEARSON.

Witnesses:
 RAY PATTISON,
 FRANK A. ZABILKA.